(12) United States Patent
Le Callonnec et al.

(10) Patent No.: US 12,243,051 B2
(45) Date of Patent: Mar. 4, 2025

(54) METHOD AND SYSTEM FOR PRIVATELY MANAGED DIGITAL ASSETS ON AN ENTERPRISE BLOCKCHAIN

(71) Applicant: MASTERCARD INTERNATIONAL INCORPORATED, Purchase, NY (US)

(72) Inventors: Sébastien Le Callonnec, Greystones (IE); Rakesh Yadav, Cape Elizabeth, ME (US); Thomas Treitlinger, Portmarnock (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 84 days.

(21) Appl. No.: 17/412,923

(22) Filed: Aug. 26, 2021

(65) Prior Publication Data
US 2023/0068301 A1 Mar. 2, 2023

(51) Int. Cl.
*G06Q 20/38* (2012.01)
*G06Q 20/06* (2012.01)
*H04L 9/32* (2006.01)

(52) U.S. Cl.
CPC ....... *G06Q 20/3827* (2013.01); *G06Q 20/065* (2013.01); *G06Q 20/3829* (2013.01);
(Continued)

(58) Field of Classification Search
CPC ............. G06Q 20/3827; G06Q 20/065; G06Q 20/3829; G06Q 20/389; G06Q 2220/00; H04L 9/3247; H04L 2209/56
See application file for complete search history.

(56) References Cited

U.S. PATENT DOCUMENTS 11,151,276 B1 * 10/2021 Wang ..................... G06Q 20/02
11,568,374 B1 * 1/2023 Daruwalla ............. G06Q 40/02
(Continued)

FOREIGN PATENT DOCUMENTS

WO WO-2021011308 A1 * 1/2021 ............. G06F 21/31

OTHER PUBLICATIONS

Notification of Transmittal of the International Search Report and the Written Opinion of the International Searching Authority in International Application No. PCT/US2022/038149 dated Jul. 25, 2022, 13 pps.

*Primary Examiner* — Courtney P Jones
*Assistant Examiner* — Christine Dang
(74) *Attorney, Agent, or Firm* — Panitch Schwarze Belisario & Nadel LLP (57) ABSTRACT

A method for private management of digital assets for multiple participants of a global blockchain includes: receiving, by a receiver of a processing server, a transaction notification for a proposed currency transfer, the transaction notification including at least a sending identifier, a recipient identifier, and a transfer amount; generating, by a processor of the processing server, a transaction data value for the proposed currency transfer, the transaction data value including at least the sending identifier, the recipient identifier, and the transfer amount; applying, by the processor of the processing server, a cryptographic hashing function to the generated transaction data value to generate a hash value; publishing, by the processor of the processing server, the generated transaction data value to a private blockchain; and publishing, by the processor of the processing server, the generated hash value to a public or permissioned blockchain.

12 Claims, 5 Drawing Sheets

(52) U.S. Cl.
CPC ......... *G06Q 20/389* (2013.01); *H04L 9/3247* (2013.01); *G06Q 2220/00* (2013.01); *H04L 2209/56* (2013.01)

(56) References Cited

U.S. PATENT DOCUMENTS

| | | |
|---|---|---|
| 2017/0330179 A1 | 11/2017 | Song et al. |
| 2017/0344987 A1* | 11/2017 | Davis ................... H04L 9/3247 |
| 2018/0189877 A1* | 7/2018 | Uhr ..................... G06Q 20/3829 |
| 2018/0232731 A1* | 8/2018 | Liu ....................... H04L 9/3247 |
| 2018/0253464 A1 | 9/2018 | Kohli et al. |
| 2019/0013933 A1* | 1/2019 | Mercuri ................ G06F 16/904 |
| 2019/0052454 A1 | 2/2019 | Wright et al. |
| 2019/0236594 A1* | 8/2019 | Ehrlich-Quinn ..... G06Q 20/401 |
| 2019/0354606 A1* | 11/2019 | Snow ................... H04L 9/0863 |
| 2020/0051069 A1* | 2/2020 | Wilson ............... G06Q 20/3672 |
| 2020/0118096 A1* | 4/2020 | Yang .................... H04L 9/0637 |
| 2020/0202358 A1* | 6/2020 | McClelland ......... G06Q 20/223 |
| 2020/0213127 A1* | 7/2020 | Maniyar .............. G06Q 20/065 |
| 2020/0320490 A1* | 10/2020 | Yeap ................ G06Q 20/38215 |
| 2020/0327616 A1* | 10/2020 | Burke ................... H04L 9/3239 |
| 2020/0334671 A1 | 10/2020 | Davies et al. |
| 2020/0366480 A1* | 11/2020 | Noonan ................ G06Q 20/065 |
| 2021/0083845 A1* | 3/2021 | Sen ....................... H04L 9/3247 |
| 2021/0091925 A1 | 3/2021 | Davis et al. |
| 2021/0192474 A1 | 6/2021 | Mossoba et al. |
| 2021/0218549 A1* | 7/2021 | Huang .................. G06F 21/645 |
| 2021/0297251 A1* | 9/2021 | Yang .................... H04L 9/3255 |
| 2021/0303713 A1* | 9/2021 | Sreedhar .............. H04L 9/0861 |

\* cited by examiner

METHOD AND SYSTEM FOR PRIVATELY MANAGED DIGITAL ASSETS ON AN ENTERPRISE BLOCKCHAIN

FIELD

The present disclosure relates to the private management of digital assets for multiple participants of a global blockchain, specifically the use of both a private blockchain and public, global blockchain to ensure secure and accurate management of digital assets for multiple participants.

BACKGROUND

Blockchains are often associated with cryptographic currency but have applications that can go well beyond the transfer of currency and other financial transactions. For instance, blockchains have been used to assist in voting, storing land deed information, tracking the provenance of diamonds and other luxury products, and internally by many organizations and entities as a more sophisticated storage solution. In many cases, blockchains are used because they provide an immutable and auditable record, as the data stored therein cannot be changed as new blocks are added by virtue of how the generation and addition of new blocks operates.

As a result, many entities have established blockchains of their own for use in storing data. Because the needs of each entity may vary, entities may customize blockchains to suit their own needs in a manner that is formatted differently or includes different data from the blockchains of other entities. Such entities may engage in a business relationship where each entity is participating in a mutual industry, such as banks engaged in commerce. The banks may use blockchains to keep track of internal accounts and currency transfers, and each bank may not only format their own blockchains differently, but also have a great interest, and may also be required, in keeping such data private. At the same time, each entity may be interested in accountability, particularly when transfers may be made among the various entities. One solution to such accountability is a global blockchain ledger, such as described in U.S. patent application Ser. No. 16/576,915, filed on Sep. 20, 2019, entitled "Method and System for Distribution of a Consistent Ledger Across Multiple Blockchains," by Steven C. Davis et al., which is herein incorporated by reference in its entirety.

However, a global blockchain ledger is typically designed to store state commitments for the blockchains of participants where the state commitments are stored as hashes or otherwise in a format that cannot be reverse-engineered and does not reveal underlying data to other participants. When two participants engage in a transaction together, with each participant updating their own blockchains, new state commitments are added to the global ledger. However, if there is a disagreement between the two participants as to the details of the transaction, if there is a mistake made by one of the participants, or there is otherwise some dispute or error, the only evidence are the state commitments. In such a case, each participant may be able to show the accurate ledger that resulted in their own state commitment but may not be able to provide any evidence or proof as to the true nature of the transaction between participants.

Thus, there is a need for a technical improvement to enable accurate data regarding participant transactions to be stored in a secure and immutable manner without sacrificing the benefits of a consistent, global ledger and while also maintaining complete privacy for the transaction history and activity of each participant.

SUMMARY

The present disclosure provides a description of systems and methods for private management of digital assets for multiple participants of a global blockchain. A centralized computer system, also referred to herein as a central bank system, processing server, digital asset transfer handler, or just transfer handler, is used as a third party facilitator for transfers of digital assets between two systems that both participate in a consistent, global ledger. For example, the two systems may be a central bank and at least one other bank that use their own internal blockchains for internal accounting and transfers, with state commitments stored in the global ledger, but where the two systems want to facilitate a transfer of currency or assets from one bank to the other. Information regarding the transfer is provided to the transfer handler, which verifies the proposed transfer, and then initiates the transfer. Detailed information regarding the proposed transfer is stored in a private blockchain accessible only by the transfer handler, while a hash of the transfer is stored in the global ledger, enabling both participant systems to be able to validate that the transfer took place and was properly recorded while still maintaining full privacy. The private ledger is maintained by the transfer handler to serve as a trusted record for the transfer should any dispute arise, for auditing, or any other suitable purpose. The result is an improvement to global ledgers that provides for added protection in cases of transfers between participants without sacrificing security or convenience.

A method for private management of digital assets for multiple participants of a global blockchain includes: receiving, by a receiver of a processing server, a transaction notification for a proposed currency transfer, the transaction notification including at least a sending identifier, a recipient identifier, and a transfer amount; generating, by a processor of the processing server, a transaction data value for the proposed currency transfer, the transaction data value including at least the sending identifier, the recipient identifier, and the transfer amount; applying, by the processor of the processing server, a cryptographic hashing function to the generated transaction data value to generate a hash value; publishing, by the processor of the processing server, the generated transaction data value to a private blockchain; and publishing, by the processor of the processing server, the generated hash value to a public or permissioned blockchain.

A system for private management of digital assets for multiple participants of a global blockchain includes: a first computing system transmitting a transaction notification for a proposed currency transfer, the transaction notification including at least a sending identifier, a recipient identifier, and a transfer amount; and a processing server including a receiver receiving the transaction notification from the first computing system, and a processor generating a transaction data value for the proposed currency transfer, the transaction data value including at least the sending identifier, the recipient identifier, and the transfer amount, applying a cryptographic hashing function to the generated transaction data value to generate a hash value, publishing the generated transaction data value to a private blockchain, and publishing the generated hash value to a public or permissioned blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain-A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Private Management of Digital Assets

Figure 1:
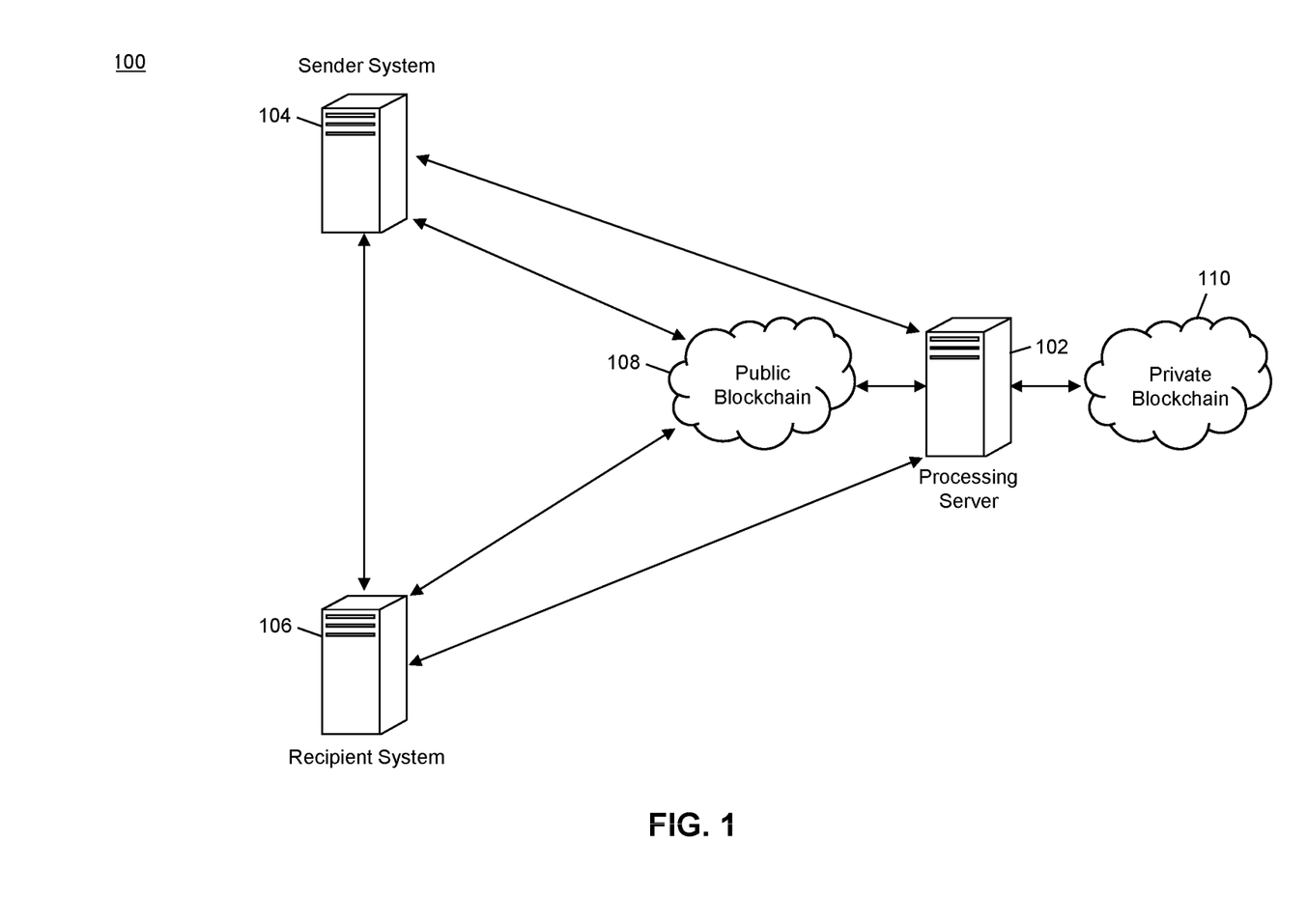
FIG. 1 is a block diagram illustrating a high-level system architecture for private management of digital assets in accordance with exemplary embodiments.

FIG. 1 illustrates a system 100 for the private management of digital assets between participants in a global blockchain using an intermediary system and a private blockchain.

The system 100 may include a processing server 102. The processing server 102, discussed in more detail below, may be a central system, digital asset transfer handler, transfer handler, or other system and/or entity that manages a global ledger utilized by multiple participants, such as a sender system 104 and recipient system 106. In traditional systems, each participant may utilize its own blockchain for any purposes and may regularly provide state commitments for their own blockchain to the processing server 102 in the form of a hash value of the blockchain generated via the application of a one-way cryptographic hashing function to the blockchain. The state commitments may be stored in a global ledger by the processing server 102 that may be publicly accessible or may be a permissioned blockchain that is accessible to the participants. As illustrated in FIG. 1, the global ledger may be the public blockchain 108.

In the system 100, the processing server 102 may be configured to also provide for private management of the digital assets of the participants that may be transferred between participants, such as a transfer of digital currency or other assets from the sender system 104 to the recipient system 106. In an example, the sender system 104 and recipient system 106 may both be banks that manage transaction accounts for their members where one bank (the sender system 104) wants to transfer an amount of currency to the other bank (the recipient system 106). In the system 100, the processing server 102 may facilitate the transfer of assets and record the transfer in both the public blockchain 108 in a hashed form as well as in a non-hashed form in a private blockchain 110. The private blockchain 110 may be a blockchain that is only accessible by the processing server 102 and any other authorized systems that may not necessarily include any participants in the public blockchain 108. For instance, the private blockchain 110 may remain private to the processing server 102 where only the relevant data values and/or blocks may be made available in cases of dispute, auditing, etc.

Figure 2:
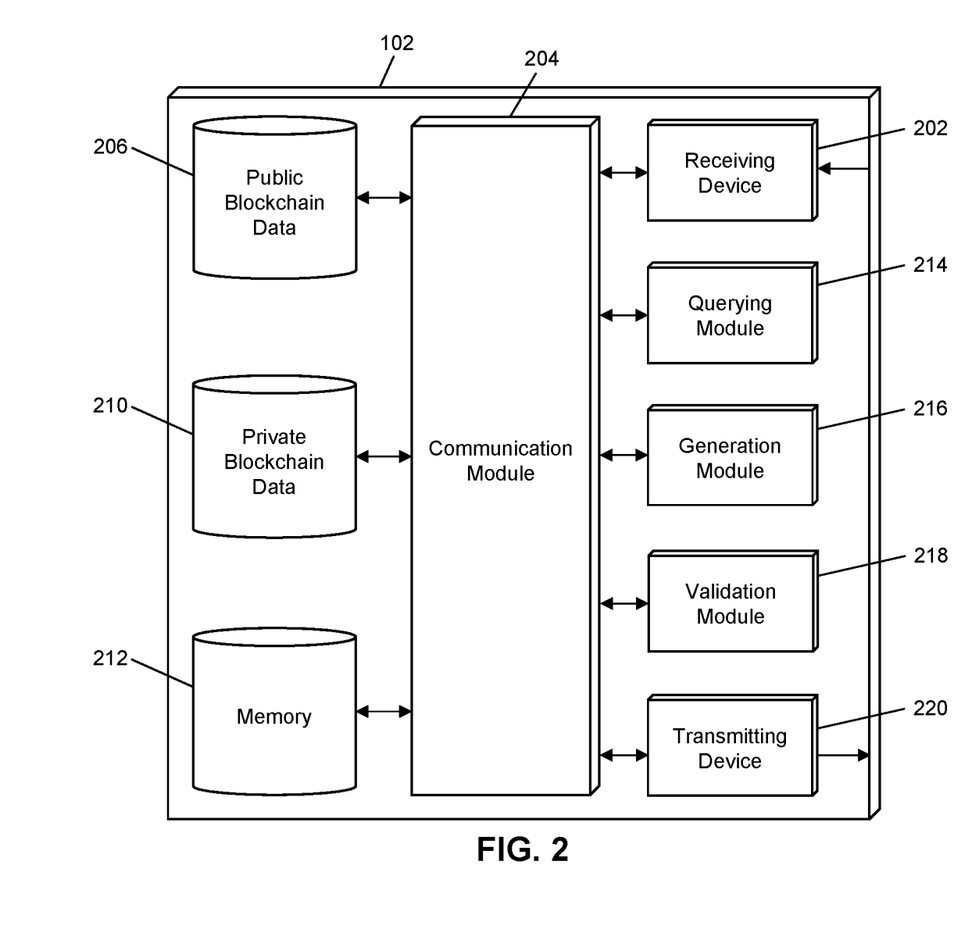
FIG. 2 is a block diagram illustrating a processing server of the system of FIG. 1 for the private management of digital assets in accordance with exemplary embodiments.
Figure 5:
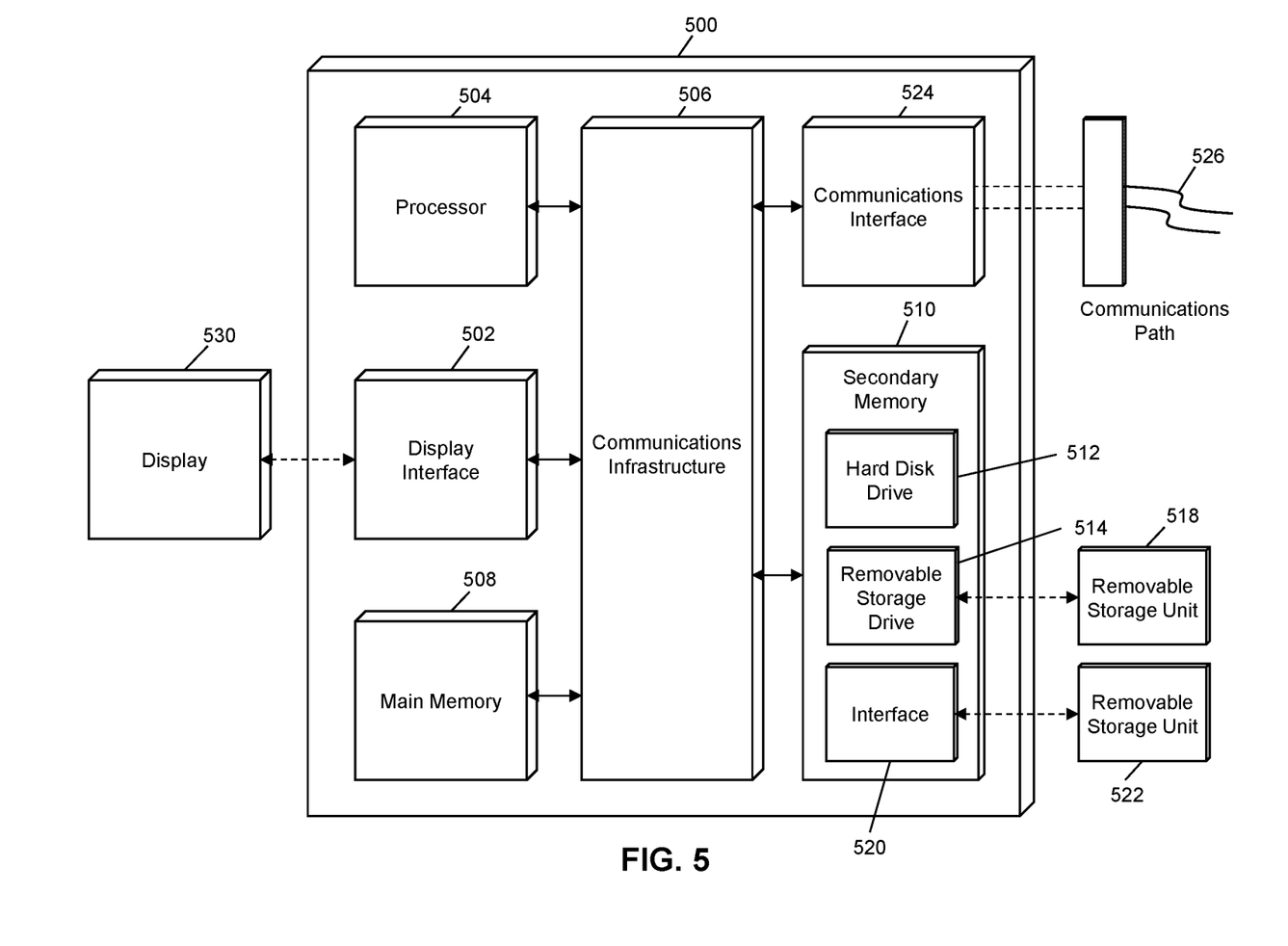
FIG. 5 is a block diagram illustrating a computer system architecture in accordance with exemplary embodiments.

In the system 100, the processing server 102 may be a blockchain node for both the public blockchain 108 and private blockchain 110. In some cases, the processing server 102 may be the only node in one or both blockchain networks. In other cases, there may be multiple instances of the processing server 102 where each is a node in a network for the public blockchain 108 and/or private blockchain 110. For example, instances of the processing server 102 may be established throughout the world or otherwise spread geographically for convenience to the participants. Each blockchain node (e.g., processing server 102) may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of each blockchain the node participates in.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in the blockchain network prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network using the public key of the cryptographic key pair. In some cases, the term "blockchain wallet" may refer specifically to the private key. In other cases, the term "blockchain wallet" may refer to a computing device (e.g., sender system 104) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., the sender system 104) that is generated using the sender's private key, a blockchain address of the recipient of currency (e.g., the recipient system 106) generated using the recipient's public key, and a blockchain currency amount that is transferred or other data being stored. In the case of the blockchain being used for data storage separate from currency, the currency amount may be replaced by such other data. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node in the blockchain network, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network before being added to the blockchain and distributed to all of the blockchain nodes in the blockchain network in traditional blockchain implementations. In cases where a blockchain data value may not be related to a blockchain transaction, but instead the storage of other types of data, blockchain data values may still include or otherwise involve the validation of a digital signature.

In the system 100, the public blockchain 108 may be used to store only hashed data. In other words, each blockchain data value included in the public blockchain 108 may store hash values, such as hashes of state commitments of the blockchains of participants (e.g., the sender system 104, recipient system 106, etc.) and hashes of asset transfers, as discussed below. The private blockchain 110 may be used as a private record for asset transfers between participants in the public blockchain 108, such as to store a record for a transfer of digital assets from the sender system 104 to the recipient system 106.

When the sender system 104 or recipient system 106 is interested in a transfer of assets with the other system, the initiating system may send a proposal message to the other system using any suitable communication network and method. The proposal message may include at least the amount of digital assets that are to be transferred. In some cases, the digital assets may be a digital currency, such as a cryptographic currency that is utilized by the private blockchain 110 where all transfers are made as new transactions in the private blockchain 110. In other cases, the two systems may transfer actual assets (e.g., one bank may transfer currency to the other bank) where "digital assets" refers to a digital representation of the asset being transferred (e.g., an electronic representation of the amount of currency transferred between the banks). The two systems may agree on the transfer to be made, such as through the use of multiple messages, negotiations, contracts, etc.

When the systems have agreed on the transfer, the sender system 104 may submit a transfer notification to the processing server 102 using any suitable communication network and method, such as via a web form, application program, application programming interface, etc. The transfer notification may include at least an identifier associated with the sender system 104, an identifier associated with the recipient system 106, and the digital asset being transferred (e.g., an amount of currency). In cases where the private blockchain 110 is used to store digital currency for each participant, the identifier associated with the sender system 104 may include a digital signature generated by the sender system 104 using a private key of its cryptographic key pair, the identifier associated with the recipient system 106 may be a blockchain address generated using a public key of the cryptographic key pair of the recipient system 106, and the digital asset may be the amount of digital currency being transferred from the blockchain wallet of the sender system 104 to the blockchain wallet of the recipient system 106. In some embodiments, the processing server 102 may manage all blockchain wallets. In such cases, the identifiers may be identification values for the sender system 104 and the recipient system 106 and the processing server 102 may generate the digital signature and blockchain address for the transfer using suitable methods with the cryptographic key pairs managed by the processing server 102.

Once the processing server 102 receives the transfer notification, the processing server 102 may validate the transfer notification to ensure that the transfer is proper and authorized. In cases where a digital signature is included in the transfer notification, validation of the transfer may include validating the digital signature using a public key of the cryptographic key pair that included the private key used to generate the digital signature. In instances where the transfer is to be made using the private blockchain 110, the transfer notification may include one or more transaction outputs for prior transfers of digital currency to the sender system 104. In such instances, validation of the transfer notification may include verifying that each of the one or more transaction outputs were to the sender system 104 (e.g., using the digital signature and/or public key) and that each of the one or more transaction outputs is currently unspent. In some embodiments, validation may include transmitting a message to the recipient system 106 to ensure that the recipient system 106 approves of the proposed transfer and receiving an approval message from the recipient system 106, which may, in some cases, itself be validated such as through a digital signature or other suitable mechanism.

If the validation is unsuccessful, then the processing server 102 may transmit a message to the sender system 104 indicating that the validation failed. In some cases, a reason may be provided, such as a decline by the recipient system 106, a provided transaction output being previously spent, an insufficient amount of digital currency for the provided transaction output(s), a failed validation of the digital signature, etc. If the validation is successful, then the processing server 102 may electronically transmit an approval message to the sender system 104 using a suitable communication network and method. In some cases, the approval message may include data regarding the transfer itself if performed by the processing server 102, such as a confirmation number or hash value, as discussed below.

Once the validation is successful and the transfer approved, the transfer may be initiated. In an exemplary embodiment, the processing server 102 may perform the transfer. In cases where the transfer is a blockchain transaction using the private blockchain 110, the processing server 102 may generate a new blockchain data value for the private blockchain that includes the unspent transaction output(s), the digital signature, the destination address, and the currency amount being transferred to the destination address. The currency amount and destination address may constitute a new unspent transaction output, which may later be utilized by the recipient system 106 in a new transaction (e.g., as a sender). In another instance, the processing server 102 may transfer a digital token or other value representative of the actual asset being transferred between the two systems using the private blockchain 110, such as where digital tokens may be used in place of fiat currency transferred between participants in the public blockchain 108. In cases where the transfer is of other assets, the transfer may be initiated by the sender system 104 using the appropriate platform and method after receipt of the approval message, such as a wire transfer of currency. In such cases, the sender system 104 may provide the processing server 102 with proof of such transfer, such as a receipt, confirmation number, etc.

Once the transfer has been completed, the processing server 102 may include a blockchain data value for the transfer in a new block that is generated and added to the private blockchain 110. In cases where the transfer is a blockchain transaction using the private blockchain 110, the blockchain data value generated for the actual transaction may serve as the blockchain data value noted above. In other cases, the blockchain data value may include an unspent transaction output or other data regarding the transfer, such as the sender identifier, recipient identifier, and transfer amount, the receipt or confirmation number provided by the sender system 104, or any other data that may be provided or otherwise obtained by the processing server 102 for the transfer. The data included in the blockchain data value stored in the new block in the private blockchain 110 may be data that is suitable to prove the transfer and provide for any auditing of activity by the sender system 104 and/or recipient system 106.

The processing server 102 may also generate a hash value for the transfer. To generate the hash value, the processing server 102 may apply a cryptographic function to the blockchain data value for the transfer stored in the private blockchain 110. In an exemplary embodiment, the cryptographic function may be a one-way hashing function that generates hash values of sufficient complexity to be collision-resistant, such as the Secure Hash Algorithm 256 (SHA-256). The hash value may be included in a new blockchain data value that is generated by the processing server 102 and included in a new block that is generated and added to the public blockchain 108. In some embodiments, the processing server 102 may electronically transmit a notification message to at least the sender system 104 that includes the hash value or a notification that a hash value for the transfer was successfully added to the public blockchain 108. In some cases, the notification message and the approval message may be the same message. In some instances, the processing server 102 may also electronically transmit a notification message to the recipient system 106, such as may be identified using the recipient identifier included in the transfer notification. In other cases, the sender system 104 may communicate information regarding the successful transfer to the recipient system 106. Once the hash value has been published to the public blockchain 108, the sender system 104 and recipient system 106 may update their own internal blockchains accordingly, where a state commitment thereof may be registered on the public blockchain 108 during the usual course of business by each participant.

In some embodiments, one or more functions of the processing server 102 may be implemented via a smart contract. A smart contract may be a self-executable digital object that can be stored in a blockchain that, once one or more criteria are fulfilled, cause the smart contract to execute to carry out one or more actions. In the system 100, the smart contract may receive a transaction notification from a sender system 104, which may initiate the validation of the proposed transaction, initiate the proposed transaction, generate the blockchain data value for the transfer, generate the hash of the blockchain data value, and publish the appropriate data to the public blockchain 108 and private blockchain 110. In some cases, the smart contract may only perform a portion of the above steps, or each of the above steps may be performed by a combination of multiple smart contracts. The smart contract may be stored in the private blockchain 110 as a blockchain data value therein or may be stored in other memory or storage of the processing server 102.

The methods and systems discussed herein enable the processing server 102 to provide for private management of digital assets by participants in the public blockchain 108 as a global ledger. The private blockchain 110 may be used to record detailed information regarding the transfer of digital assets or other transfers between participants in the public blockchain 108. Because the private blockchain 110 is private and not accessible by the participants, sensitive data for the participants can remain inaccessible to other participants while still being available to the processing server 102 to settle disputes, assist with auditing, etc. By storing hash values for the transfers in the public blockchain 108, there is a publicly accessible records of the transfers that can be verified by the sender system 104 and recipient system 106 as parties to the transfer as each system knows all of the data involved in the transfer and could generate a hash value for the transfer and verify that it matches the hash value added to the public blockchain 108 for the transfer. The result is that the public blockchain 108 can store secure and anonymous data regarding asset transfers by participants for public accessibility and verification without sacrificing the anonymity and security, where the private blockchain 110 enables the transfers themselves to be proven in cases of dispute or, in cases where the private blockchain 110 itself holds assets, enables the transfer of digital assets among participants in a secure and anonymous manner that is privately managed by the processing server 102. In every case, the methods and systems discussed herein provide for technical improvements in the management of digital assets for participants in a global ledger.

Processing Server

FIG. 2 illustrates an embodiment of a processing server 102, such as the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from blockchain nodes, other processing servers 102, sender systems 104, recipient systems 106, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain nodes or other processing servers 102, which may be superimposed or otherwise encoded with blockchain data values, blocks, blockchain transaction data, etc. The receiving device 202 may also be configured to receive data signals electronically transmitted by sender systems 104 that may be superimposed or otherwise encoded with transaction notifications, which may include sender data, recipient data, digital signatures, blockchain addresses, transaction outputs, transfer amounts, etc. The receiving device 202 may also be configured to receive data signals electronically transmitted by sender systems 104 and recipient systems 106, which may be superimposed or otherwise encoded with approval messages, requests for hash values, audit requests, state commitment data, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include public blockchain data 206 and private blockchain data 210, which may be stored in a memory 212 of the processing server 102 or stored in a separate area within the processing server 102 or accessible thereby. The blockchain data may include a blockchain, which may be comprised of a plurality of blocks and be associated with a blockchain network. The blockchain data may also or alternatively include any data associated with one or more blockchain wallets that may be used and/or managed by the processing server 102 or participant systems, such as cryptographic key pairs, unspent transaction outputs, digital asset amounts, smart contracts, signature generation algorithms, encryption algorithms, communication information for third party services, etc. The public blockchain data 206 may be accessible to participants and, in some cases, may be publicly accessible to any entity or system. Blocks included in the public blockchain data 206 may only include hash values and may not include any values directly associated with any participants or that may be reverse engineered. The private blockchain data 210 may be private and only accessible to the processing server 102 or may otherwise be inaccessible to participants in the public blockchain 108.

The processing server 102 may also include a memory 212. The memory 212 may be configured to store data for use by the processing server 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for other computing systems, generation algorithms, cryptographic key pairs, algorithms for calculation of currency amounts, digital asset data, access data for the public blockchain 108 and/or private blockchain 110, etc.

The processing server 102 may include a querying module 214. The querying module 214 may be configured to execute queries on databases to identify information. The querying module 214 may receive one or more data values or query strings and may execute a query string based thereon on an indicated database, such as the public blockchain data 206 of the processing server 102 to identify information stored therein. The querying module 214 may then output the identified information to an appropriate engine or module of the processing server 102 as necessary. The querying module 214 may, for example, execute a query on the private blockchain data 210 to identify transaction outputs for use by the validation module 218 to validate a received transaction notification.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate cryptographic key pairs, generate digital signatures, generate blockchain data values, generate hash values, generate approval messages, generate notification messages, etc.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to validate digital signatures using suitable signature generation algorithms and keys, validate blockchain transactions, validate smart contracts, validate transaction notifications, validate currency or asset amounts, etc.

The processing server 102 may also include a transmitting device 220. The transmitting device 220 may be configured to transmit data over one or more networks via one or more network protocols. In some instances, the transmitting device 220 may be configured to transmit data to blockchain nodes, other processing servers 102, sender devices 104, recipient devices 106, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes or other processing servers 102, which may be superimposed or otherwise, requests for blocks, requests for blockchain data values, new blocks, blockchain data values, transaction outputs, asset amounts, hash values, etc. The transmitting device 220 may also be configured to electronically transmit data signals to sender devices 104 and/or recipient devices 106 that may be superimposed or otherwise encoded with approval messages, requests for data, approval requests, notification messages, transaction outputs, hash values, etc.

Process for Private Management of Digital Assets

Figure 3:
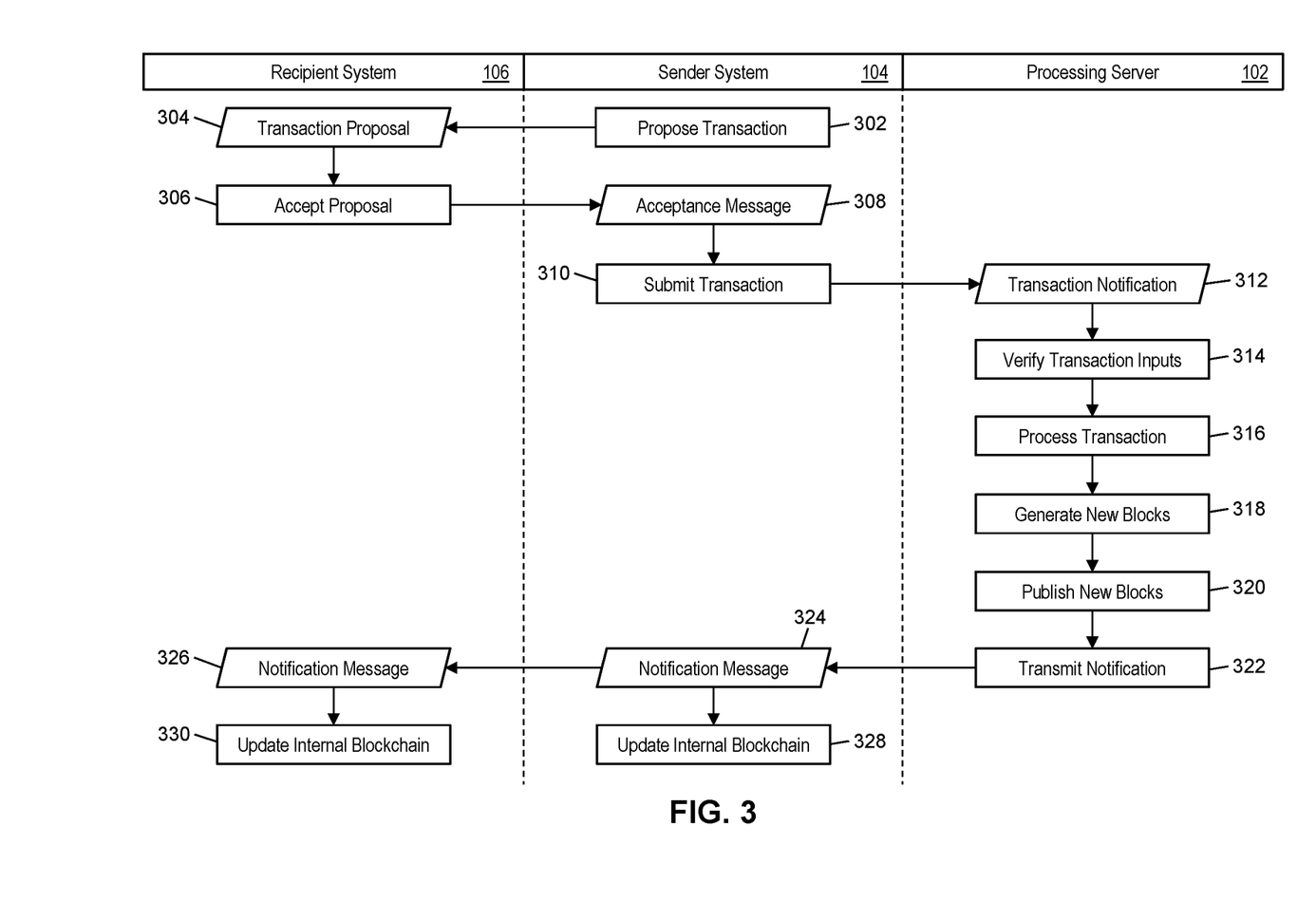
FIG. 3 is a flow diagram illustrating a process for recording a transfer of digital assets between participants of a global blockchain in the system of FIG. 1 in accordance with exemplary embodiments.

FIG. 3 illustrates a process for the private management of digital assets by the processing server 102 of the system 100 using the global ledger of the public blockchain 108 and the private blockchain 110.

In step 302, the sender system 104 may electronically transmit a proposal message to the recipient system 106 to propose a new transaction for the transfer of digital assets from the sender to the recipient. The proposal message may be electronically transmitted using any suitable communication network and method. In step 304, the recipient system 106 may receive the transaction proposal, which may include at least an amount of digital assets to be transferred. If the recipient decides to accept the transfer, then, in step 306, the recipient system 106 may electronically transmit an acceptance message back to the sender system 104. The acceptance message may include a blockchain address generated using a public key of a cryptographic key pair of the recipient system 106 or may include an identifier associated with the recipient system 106. In step 308, the sender system 104 may receive the acceptance message from the recipient system 106.

In step 310, the sender system 104 may electronically transmit a transaction notification to the processing server 102 for the transfer of digital assets from the sender to the recipient as approved by the recipient. The transaction notification may include the identifier or blockchain address provided by the recipient system 106 in the acceptance message, a transfer amount, an identifier associated with the sender system 104 or a digital signature generated using the private key of a cryptographic key pair of the sender system 104, and one or more transaction outputs representing the receipt of digital assets by the sender system 104 that are to be transferred in the proposed transaction. In step 312, the receiving device 202 of the processing server 102 may receive the transaction notification from the sender system 104 using a suitable communication network and method.

In step 314, the validation module 218 of the processing server 102 may validate the proposed transaction. Validation of the proposed transaction may include validating the digital signature using the public key of the recipient system's cryptographic key pair, if applicable, validation of the one or more transaction outputs as being valid, validation of the one or more transaction outputs as being in control by the sender system 104, validation that the one or more transaction outputs are currently unspent, and validation that the amount of digital assets transferred to the one or more transaction outputs are sufficient to cover the desired transfer amount in the transaction notification. In embodiments where the processing server 102 may manage cryptographic key pairs on behalf of participants, step 314 may include the generation of a digital signature using a private key associated with the sender system 104 and generation of a blockchain address using a public key associated with the recipient system 106.

If the transaction notification is successfully validated, then, in step 316, the processing server 102 may process a new blockchain transaction for the requested transfer of digital assets from a blockchain wallet associated with the sender system 104 to a blockchain wallet associated with the recipient system 106 for the transfer amount included in the transaction notification. The processing of the new blockchain transaction may include the generation of a new blockchain data value by the generation module 216 of the processing server 102 where the blockchain data value includes the unspent transaction output(s), digital signature, destination address, and transfer amount included in the transaction notification or otherwise generated by the processing server 102. In step 318, the generation module 216 of the processing server 102 may generate a new block for the private blockchain 110 that includes the newly generated blockchain data value. The generation module 216 may also apply a one-way cryptographic hashing function to the generated blockchain data value to generate a hash value. The hash value may be included in a new block generated by the generation module 216 for the public blockchain 108. Each of the new blocks may also include a block header and reference values as well as any other data suitable for inclusion in new blocks generated for a blockchain that may vary based on the blockchain, formatting thereof, etc. as will be apparent to persons having skill in the relevant art.

In step 320, the processing server 102 may publish the new blocks to the respective blockchains. The new block in the public blockchain 108 may be accessible to the public or to authorized participants, such as the sender system 104 and recipient system 106. The new block in the private blockchain 110 may not be accessible to any system besides the processing server 102 and any other processing servers that participate in the private blockchain 110, and may be inaccessible to any participant systems without special authorization (e.g., for dispute settlement, auditing, etc.). In step 322, the transmitting device 220 of the processing server 102 may electronically transmit a notification message to the sender system 104 using a suitable communication network and method. The notification message may include a notification that the transfer of digital assets using the private blockchain 110 was successful. In some cases, the notification message may include the hash value added to the public blockchain 108 or other data that may be used to identify the hash value in the public blockchain 108 (e.g., a block identifier, timestamp, etc.). In step 324, the sender system 104 may receive the notification message. In step 326, the notification message may also be sent to, and received by, the recipient system 106. The notification message may be sent directly to the recipient system 106 by the processing server 102 or it may first be received by the sender system 104 and then forwarded on to the recipient system 106. In steps 328 and 330, the sender system 104 and recipient system 106 may each update their own internal blockchains to reflect the transfer or receipt, as applicable, of digital assets as performed by the processing server 102. The updating of the internal blockchains may be immortalized in the public blockchain 108 through a hash of a state commitment of the internal blockchain in the course of operation of the public blockchain 108 as a global ledger for the participants.

Exemplary Method for Private Management of Digital Assets

Figure 4:
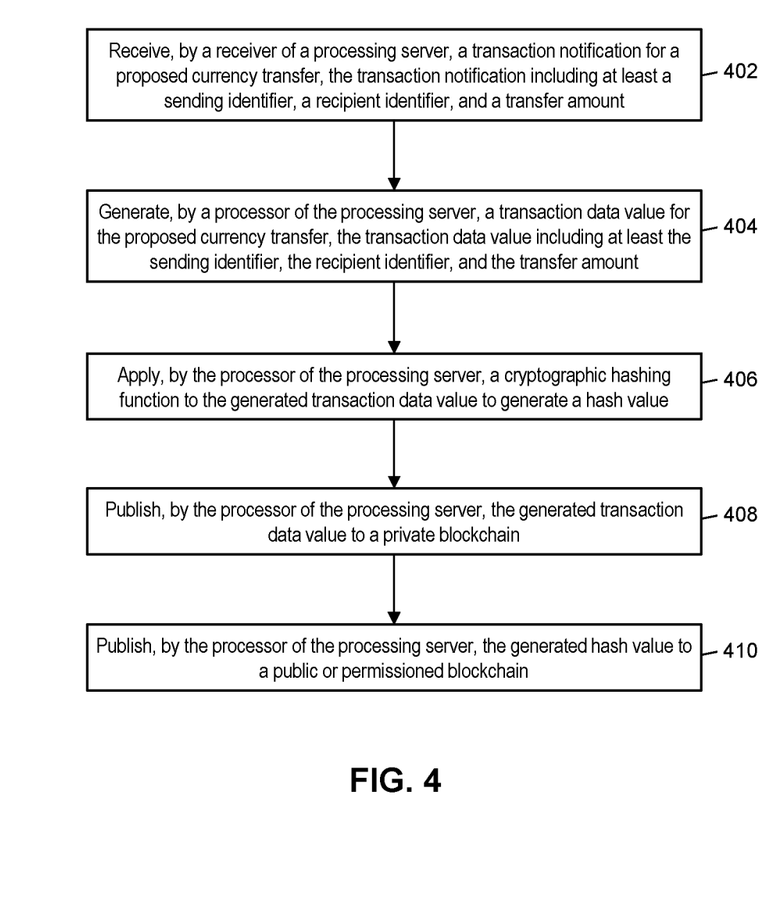
FIG. 4 is a flow chart illustrating an exemplary method for private management of digital assets for multiple participants of a global blockchain in accordance with exemplary embodiments.

FIG. 4 illustrates a method 400 for the private management of digital assets for multiple participants of a global blockchain by a digital asset transfer handler.

In step 402, a transaction notification for a proposed currency transfer may be received by a receiver (e.g., receiving device 202) of a processing server (e.g., processing server 102), the transaction notification including at least a sending identifier, recipient identifier, and a transfer amount. In step 404, a transaction data value may be generated by a processor (e.g., generation module 216) of the processing server for the proposed currency transfer, the transaction data value including at least the sending identifier, the recipient identifier, and the transfer amount.

In step 406, a cryptographic hashing function may be applied to the generated transaction data value by the processor (e.g., generation module 216) of the processing server to generate a hash value. In step 408, the generated transaction data value may be published by the processor of the processing server to a private blockchain. In step 410, the generated hash value may be published by the processor of the processing server to a public or permissioned blockchain.

In one embodiment, the method 400 may further include: verifying, by the processor (e.g., validation module 218) of the processing server, the proposed currency transfer based on at least the received transaction notification; and transmitting, by a transmitter (e.g., transmitting device 220) of the processing server, an approval message in response to the received transaction notification prior to generating the transaction data value. In a further embodiment, the method 400 may also include receiving, by the receiver of the processing server, at least one unspent transaction output in response to the transmitted approval message, wherein the at least one unspent transaction output may be included in the generated transaction data value.

In another further embodiment, the transaction notification may further include at least one unspent transaction output and verifying the proposed currency transfer may include verifying that each of the at least one unspent transaction output is unspent. In an even further embodiment, the at least one unspent transaction output may refer to a prior blockchain transaction in the private blockchain. In another even further embodiment, the method 400 may also include identifying, by the processor of the processing server, a new transaction output, wherein the new transaction output may be included in the generated transaction data value.

In some embodiments, the generating, applying, and publishing steps may be performed by a smart contract executed by the processor of the processing server. In one embodiment, the sending identifier may be a digital signature generated using a private key of a first cryptographic key pair, the recipient identifier may be a blockchain address generated using a public key of a second cryptographic key pair, and the transfer amount may be an amount of blockchain currency.

Computer System Architecture

FIG. 5 illustrates a computer system 500 which embodiments of the present disclosure, or portions thereof, may be implemented as executed computer-readable code on hardware. For example, the processing server 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for private management of digital assets for multiple participants of a global blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for private management of digital assets for multiple participants of a global blockchain, comprising:

transmitting, by a sender system, a proposal message to a receiver system, wherein the proposal message includes at least an amount of digital assets that are to be transferred in a new currency transfer to be made between the sender system and the receiver system;

establishing an agreement, by the sender system and the receiver system, on the new currency transfer to be made;

subsequent to establishing the agreement, transmitting, by the sender system, to a processing server, a transfer notification for the new currency transfer between the sender system and the receiver system, the transfer notification including at least (i) a sending identifier associated with the sender system, (ii) a recipient identifier associated with the receiver system, (iii) a transfer amount, and (iv) at least one unspent transaction output that pertains to a prior blockchain transaction in a private blockchain and in which currency for the prior blockchain transaction is unspent;

receiving, by a receiver of the processing server, the transfer notification sent by the sender system;

performing a successful validation of the transfer notification by (i) validating a digital signature using a public key of a cryptographic key pair and (ii) transmitting, by a transmitter of the processing server, a message to the receiver system requesting assurance that the receiver system approves of the new currency transfer;

in response to the successful validation, executing, by a processor of the processing server, the new currency transfer by transferring the transfer amount from the at least one unspent transaction output to a destination address;

generating, by a processor of the processing server, a transaction data value for the new currency transfer, the transaction data value including at least the sending identifier, the recipient identifier, and the transfer amount;

generating, by the processor of the processing server, a first new block for inclusion in the private blockchain, said private blockchain being accessible only by the processing server, said first new block including the transaction data value and the at least one unspent transaction output;

generating, by the processor of the processing server, a hash value that is collision-resistant by applying a cryptographic hashing function to the generated transaction data value;

generating, by the processor of the processing server, a second new block for inclusion in a public blockchain that is accessible by the processing server, sender system and receiver system, said second new block includes the collision-resistant hash value;

publishing, by the processor of the processing server, the generated first new block including the transaction data value to the private blockchain that is accessible by the processing server; and publishing, by the processor of the processing server, the generated second new block including the collision resistant hash value to the public blockchain that is accessible by the processing server, sender system and receiver system.

2. The method of claim 1, further comprising:
transmitting, by a transmitter of the processing server, an approval message in response to the received transfer notification prior to generating the transaction data value.

3. The method of claim 1, wherein
validating the new currency transfer includes verifying that each of the at least one unspent transaction output is unspent.

4. The method of claim 3, further comprising:
identifying, by the processor of the processing server, a new transaction output, wherein the new transaction output is included in the generated transaction data value.

5. The method of claim 1, wherein the generating and publishing steps are performed by a smart contract executed by the processor of the processing server.

6. The method of claim 1, wherein
the transfer amount is an amount of blockchain currency.

7. A system for private management of digital assets for multiple participants of a global blockchain, comprising:
a first computing system;
a second computing system; and
a processing server, wherein
the first computing system transmits a proposal message to the second computing system, wherein the proposal message includes at least an amount of digital assets that are to be transferred in a new currency transfer to be made between the first computing system and the second computing system,
the first computing system and the second computing system establish an agreement on the new currency transfer to be made,
subsequent to the first computing system and the second computing system establishing the agreement, the first computing system transmits a transfer notification to the processing server, wherein the transfer notification includes including at least (i) a sending identifier associated with the first computing system, (ii) a recipient identifier associated with the second computing system, (iii) a transfer amount, and (iv) at least one unspent transaction output that pertains to a prior blockchain transaction in a private blockchain and in which currency for the prior blockchain transaction is unspent, and
the processing server includes
a receiver receiving the transfer notification from the first computing system, and
a processor
performing a successful validation of the transfer notification by (i) validating a digital signature and (ii) transmitting a message to the second computing system requesting assurance that the second computing system approves of the new currency transfer;
in response to the successful validation,
executing, by a processor of the processing server, the new currency transfer by transferring the transfer amount from the at least one unspent transaction output to a destination address,
generating a transaction data value for the new currency transfer, the transaction data value including at least the sending identifier, the recipient identifier, and the transfer amount,
generating a first new block for inclusion in the private blockchain, said private blockchain being accessible only by the processing server, said first new block including the transaction data value and the at least one unspent transaction output;
generating a hash value that is collision-resistant by applying a cryptographic hashing function to the generated transaction data value,
generating a second new block for inclusion in a public blockchain that is accessible by the processing server, first computing system and second computing system, said second new block includes the collision-resistant hash value;
publishing the generated first new block including the transaction data value to the private blockchain that is accessible by the processing server, and
publishing the generated second new block including the collision resistant hash value to the public or permissioned blockchain that is accessible by the processing server, first computing system and second computing system.

8. The system of claim 7, wherein
the processing server further includes a transmitter transmitting an approval message in response to the received transfer notification prior to generating the transaction data value.

9. The system of claim 8, wherein
validating the new currency transfer includes verifying that each of the at least one unspent transaction output is unspent.

10. The system of claim 9, wherein
the processor of the processing server identifies a new transaction output, and
the new transaction output is included in the generated transaction data value.

11. The system of claim 7, wherein the generating and publishing actions are performed by a smart contract executed by the processor of the processing server.

12. The system of claim 7, wherein
the transfer amount is an amount of blockchain currency.

* * * * *